United States Patent
Wicker, Jr. et al.

(10) Patent No.: US 9,083,454 B2
(45) Date of Patent: Jul. 14, 2015

(54) SYSTEMS AND METHODS FOR BEAMFORMING MEASUREMENTS

(71) Applicant: Ixia, Calabasas, CA (US)

(72) Inventors: David Jennings Wicker, Jr., Hillsboro, OR (US); Lester Noel Stott, Aloha, OR (US); Jeffrey Dean Marker, Sherwood, OR (US); Alexander David Rekow, Portland, OR (US); Thomas Alexander, Mulino, OR (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 14/043,799

(22) Filed: Oct. 1, 2013

(65) Prior Publication Data
US 2015/0092824 A1   Apr. 2, 2015

(51) Int. Cl.
| | |
|---|---|
| *H04B 3/46* | (2006.01) |
| *H04B 17/00* | (2015.01) |
| *H04B 7/04* | (2006.01) |
| *H04B 7/06* | (2006.01) |
| *H04B 7/02* | (2006.01) |
| *H04L 25/03* | (2006.01) |

(52) U.S. Cl.
CPC ............ *H04B 17/009* (2013.01); *H04B 7/0417* (2013.01); *H04B 7/0452* (2013.01); *H04B 7/024* (2013.01); *H04B 7/04* (2013.01); *H04B 7/0413* (2013.01); *H04B 7/0617* (2013.01); *H04B7/0636* (2013.01); *H04B 17/00* (2013.01); *H04L 2025/03426* (2013.01)

(58) Field of Classification Search
CPC .. H04B 7/0417; H04B 7/0617; H04B 17/009; H04B 17/00; H04B 7/0452; H04B 7/04; H04B 7/024; H04B 7/0413; H04B 7/0636; H04L 2025/03426
USPC ......... 375/267, 260, 299, 347, 227, 224, 349; 455/101, 103, 132, 102, 115.1, 126
See application file for complete search history.

(56) References Cited

U.S. PATENT DOCUMENTS

| 7,890,821 B2 | 2/2011 | Music et al. |
| 2007/0243826 A1 | 10/2007 | Liu |
| 2009/0262719 A1* | 10/2009 | Shim et al. ............ 370/342 |

(Continued)

FOREIGN PATENT DOCUMENTS

EP        2 512 173 A1    10/2012

OTHER PUBLICATIONS

Notification of Transmittal of the International Search Report and the Written Opinion of the International Searching Authority, or the Declaration for International Application No. PCT/US2014/058601 (Dec. 23, 2014).

*Primary Examiner* — Rahel Guarino
(74) *Attorney, Agent, or Firm* — Jenkins, Wilson, Taylor & Hunt, P.A.

(57) ABSTRACT

Systems and methods are disclosed herein to provide communication test systems for the testing of multiple-input multiple-output (MIMO) radio frequency wireless data communication devices, systems and networks, including Multi-User MIMO (MU-MIMO) devices and systems. In accordance with one or more embodiments, a test system containing an integrated MIMO signal analyzer is disclosed that includes a protocol engine operative in conjunction with a waveform generator and waveform analyzer that analyzes the signal waveform of a device under test. Such a test system may offer improved capabilities such as a simpler and more flexible measurement of complex MIMO signal waveforms, more automated measurements of MIMO waveforms including beamforming functions, and more accurate measurement of the efficiency of MIMO related functions such as channel estimation, transmit precoding and beamforming.

22 Claims, 17 Drawing Sheets

(56) References Cited

U.S. PATENT DOCUMENTS

2010/0285753 A1 11/2010 Foegelle
2012/0100813 A1 4/2012 Mow et al.
2013/0210474 A1 8/2013 Kyösti
2014/0086075 A1* 3/2014 Asokan et al. ............... 370/252

* cited by examiner

--PRIOR ART--

SYSTEMS AND METHODS FOR BEAMFORMING MEASUREMENTS

TECHNICAL FIELD

The subject matter described herein relates generally to the test and measurement of wireless data communication systems; and more particularly to systems and methods for analyzing waveforms generated by multiple-input multiple-output data communication systems, including but not limited to multi-user multiple-input multiple-output data communication systems.

BACKGROUND

Wireless data communications devices, systems and networks that are in widespread use worldwide have become sophisticated and complex, due to the increasing need for higher data rates and the support of an increased number of users and data traffic. Accomplishing these higher rates and traffic capacities usually requires employing complex signal waveforms and advanced radio frequency capabilities such as multiple-input multiple-output (MIMO) signal coding, transmit and receive signal management methods such as beamforming, and spatial multiplexing techniques. MIMO coding in particular has received significant recent interest, as it employs the statistical properties of RF propagation channels to achieve higher data rates as well as to simultaneously accommodate multiple users (spatial multiplexing). All of these techniques, however, increase the complexity of the wireless devices. Manufacturers, vendors and users therefore have a greater need for better testing of such systems.

Unfortunately, the increasing complexity of wireless data communication devices and systems also makes them harder to test. Testing MIMO wireless systems is particularly problematic due to the difficulty of re-creating the dynamic RF channel environment. Actual open-air RF environments contain high levels of uncontrollable noise and interference, and also present time-varying and unpredictable channel statistics. However, the performance of MIMO systems is very dependent on the channel statistics. The lack of controllability and repeatability also makes it difficult or impossible to automate the testing of such wireless systems. Therefore it is very attractive to manufacturers and users to test these devices in a repeatable fashion by excluding the variability of real MIMO RF channels while still interposing accurately simulated but controllable channels. This also enables the tests to be conducted in an automated fashion.

With reference to FIG. 1, an exemplary MIMO wireless transmitter 101 and an exemplary MIMO wireless receiver 102 is shown in a simplified RF propagation environment, that may consist of an arbitrary number of RF scatterers 107. MIMO transmitter 101 has a plurality of antennas 103. Similarly, MIMO receiver 102 has a plurality of antennas 104. As depicted in FIG. 1, the multiplicity of antennas enable the transmission of multiple parallel streams of information 106, utilizing the available transmission paths (or 'modes') in the RF environment, which are created by the presence of scatterers 107. It is apparent that the performance gains due to MIMO occur as a consequence of these multiple transmission modes; removal of the scatterers causes the multiple transmission modes to collapse into a single mode, and the channel will then become unable to support more than one stream of information. Therefore, any MIMO test system must provide a means of supporting multiple transmission modes in the path between the transmitter and the receiver.

FIG. 2 is illustrative of a simplified MIMO wireless traffic and radio analyzer 111 that may be coupled to a wireless device under test (DUT) 110 containing MIMO radio interface 112 by RF cables 113. In this case, the multiple transmission modes of the real RF propagation channel may be simulated by the multiple separate cables 113, which may interconnect RF transmitters and receivers in pairs. The number of independent transmission modes (and therefore the number of parallel data streams) is equal to the number of distinct RF cables and associated transmitter/receiver pairs. All external interference, noise and propagation variations are excluded by virtue of the use of such a fully cabled RF setup.

For representational purposes, FIG. 2 and all succeeding figures herein show three cables, antennas, transmission paths, modes, etc. However, it should be understood that this is done for representational convenience, and the actual number thereof may be any number including 1. It is also not necessary for the numbers of transmitters, receivers, cables, antennas, transmission paths, modes, etc. to be equal to each other. The discussion and teachings herein are equally applicable to a MIMO system comprising any number of transmission paths and antennas and any other number of reception paths and antennas.

The exemplary system depicted in FIG. 2 shows an idealized (nearly lossless, noiseless and distortion-free) MIMO RF channel between analyzer 111 and DUT 110. In practice, however, RF propagation channels are neither lossless nor distortion-free. Turning now to FIG. 3, the loss and amplitude/phase distortion presented by actual RF propagation channels may be simulated by channel simulator (fader) 120, which is interposed between analyzer 111 and DUT 110. Such a channel simulator 120 is connected to analyzer 111 by RF cables 113, and to DUT 110 by RF cables 121, and therefore the system continues to exclude external interference and avoid uncontrollable propagation variations. However, the propagation characteristics of actual RF channels can be simulated in a controlled and repeatable fashion by modifying the configuration of channel simulator 120. The design of such a channel simulator 120 is well known in the art and will not be repeated here.

FIG. 4 depicts a situation where a single MIMO receiver 130 may receive signals concurrently from a plurality of MIMO transmitters 131, 132, 133. With a sufficiently large number of scatterers 135 in the RF propagation environment, it is possible for completely independent transmission paths (i.e., propagation modes) to be present between each of the MIMO transmitters 131, 132, 133 with respect to MIMO receiver 130. By applying appropriate digital signal processing (DSP) functions, it is possible for MIMO receiver 130 to distinguish and separate the transmitted signals from each other by virtue of these independent propagation modes. It may therefore be possible for multiple users to concurrently transmit RF signals within the same frequency band to the same receiver. This is a form of spatial multiplexing referred to as multi-user MIMO (MU-MIMO). It should be noted that the statistical properties of the RF propagation channels between the transmitters and the receiver are even more important for MU-MIMO, as the parallel streams of information are disambiguated and extracted solely by virtue of their having traversed different RF paths and having been subjected to different amplitude/phase distortions.

It will be appreciated that the situation in FIG. 4 may equally apply to a single MIMO transmitter concurrently transmitting data streams to a plurality of MIMO receivers. In this case, the transmitter may accept parallel streams of information destined for separate receivers, apply different signal processing functions to the data streams, and combine these streams for transmission on a single set of antennas. The signal processing functions are selected in such a way as to employ the statistical properties of the different RF channels existing between the transmitter and the various receivers, and maximize the desired signal at each receiver while minimizing the undesired signals (i.e., those destined for other receivers).

To enable distinct RF propagation channels to concurrently support separate MU-MIMO data streams, it may be essential that the characteristics of each individual RF propagation channel be accurately determined. This is normally performed by a process referred to as sounding the channel. Sounding entails transmitting a known signal with precisely defined properties from each transmitter to each associated receiver, and then measuring the received signal at the receiver. The RF channel between the transmitter and the receiver can then be estimated by comparing the received signal with the predetermined transmitted signal. The receiver may then feed the measured RF channel properties back to the transmitter using a predetermined control protocol. The transmitter uses these channel properties to adapt subsequently transmitted signals to the RF channel between itself and the receiver, thereby ensuring that the reception probability is maximized at the target receiver and minimized everywhere else.

With reference to FIG. 5, a possible arrangement for testing a MU-MIMO DUT 147 containing MU-MIMO radio interface 148 is depicted. In this case, wireless radio and traffic analyzers 141, 142, 143 may simulate a plurality of spatially distributed end-stations, generating independent streams of wireless traffic to DUT 147. As MU-MIMO relies upon the existence of different RF propagation channels between transmitter/receiver pairs, separate channel simulators 144, 145, 146 may be employed, one for each of analyzers 141, 142, 143. Each channel simulator may be configured to simulate a different radio channel. The outputs of channel simulators 144, 145, 146 may be combined together via RF power combiners 149 and fed to MIMO radio interface 148 in DUT 147.

Such an arrangement, unfortunately, suffers from several significant shortcomings. Firstly, the use of separate channel simulators 144, 145, 146 causes such a system to become prohibitively expensive. This is particularly true as the number of end stations represented by analyzers 141, 142, 143 increases to a large number (e.g., 500). Secondly, coupling together multiple channel simulators 144, 145, 146 causes them to interact in unpredictable ways, considerably degrading the effectiveness of the simulated RF channels, and often causing substantial distortion effects. Finally, such a system presents significant issues in terms of signal dynamic range, particularly as the number of channel simulators increases; a high-amplitude signal produced by one channel simulator may overload another channel simulator which may be producing a low amplitude signal. For these reasons, simply attaching together multiple channel simulators 144, 145, 146 to create an MU-MIMO test system is not feasible except for certain limited and carefully selected cases.

To comprehend the general functioning of an MU-MIMO system, the operation of a simple MIMO system (i.e., a single MIMO transmitter and a single MIMO receiver) will be considered first. With reference to FIG. 6, an exemplary MIMO transmitter 150 that may incorporate one method of beamforming is depicted, using one or more antennas 157 to transmit RF signals over some RF propagation medium to one or more antennas 161 of an exemplary MIMO receiver 160.

MIMO transmitter 150 may include: transmit digital data input 151, digital modulator 152 that may transform digital data to the modulation domain, for example by employing Orthogonal Frequency Division Multiplexing (OFDM); space-time mapper 153 that may map modulated symbols to one or more output streams of symbols according to some MIMO mapping algorithm; transmit precoder 154 that may perform some transformation upon the symbol streams to adapt them for transmission; digital to analog (D/A) converters 155 that may convert the digital representation of the transformed symbols to analog; and transmit RF processing functions 156 that may convert these analog signals to some desired radio frequency and transmit them using one or more antennas 157. It is understood that other functions and processing elements may also be included in MIMO transmitter 150, but are not relevant to this discussion and are therefore omitted.

MIMO receiver 160 may receive transmitted RF signals from one or more antennas 161, and may include: receive RF processing functions 162 that convert one or more streams of RF signals, after which analog to digital (A/D) conversion by A/D converters 163 may be performed to produce digital symbols; receive decoder 164 that may transform the streams of digital symbols prior to demapping and demodulation; and space-time demapper and digital demodulator 165 that may map and integrate one or more streams of symbols according to a predetermined space-time transformation, and may demodulate these symbols to recover received digital data 166. Channel estimator 167 may calculate the properties of the RF propagation medium that may exist between transmit antennas 157 and receive antennas 161, and supply this information to receive decoder 164 and space-time demapper and digital demodulator 165, to aid in transforming and recovering the digital data 166. It is likewise understood that other functions and processing elements may be included in MIMO receiver 160 but are omitted as they are not relevant to this discussion.

The properties of the RF propagation medium influence the efficiency with which MIMO signals can be transmitted and received. The RF channel properties may be used to derive the coefficients that may be set into transmit precoder 154 to adapt the symbol streams generated by space-time mapper 153 to the propagation modes of the RF channel, which may maximize the information density of the channel. Such an adaptation may be commonly referred to as beamforming or, more specifically, eigen beamforming. The RF channel properties may further be used to calculate coefficients that may be set into receive decoder 164 to post-process the received symbol streams from the propagation modes of the RF channel, which may thereby enhance the signal-to-noise ratio at MIMO receiver 160 (indirectly further maximizing the information density of the channel). Such an enhancement may be commonly referred to as combining diversity.

It is therefore apparent that an accurate knowledge of the properties of the RF channel, in particular its propagation modes, may be of great importance. It is also apparent that the receiver and transmitter may preferably share the properties of the RF channel, so that the processing performed at the transmitter corresponds to the processing performed at the receiver. Therefore, MIMO receiver 160 may preferably share channel information with MIMO transmitter 150 to achieve this goal, further preferably using a known and well defined protocol. Such a protocol for determining and sharing channel state information is commonly known as a beamforming information exchange process.

Turning now to FIG. 7, an exemplary procedure is depicted that may be used for determining the properties of the RF channel, for communicating these properties between the two ends of an RF link, and for utilizing these properties in the transmission and reception of data. Vertical lines 170 and 172 represent the operations of a MIMO transmitter and a MIMO receiver respectively. At 172, the MIMO transmitter may generate some fixed test data having a prearranged bit pattern and predetermined modulation and spatial mapping characteristics, and may transmit this data as a sounding signal, for example within a sounding packet, as represented at 173. At 174, the MIMO receiver may receive and analyze the sounding signal, which may be a sounding packet. The original sounding signal waveform being known, at 175 the MIMO receiver may calculate the RF channel properties by their effect upon the sounding signal waveform, and may further compute a precoding matrix (that may, for instance, be used within exemplary MIMO transmitter 150) that maximizes the information density for the RF channel existing between the MIMO transmitter and receiver at that point in time and space. At 176, the coefficients of the precoding matrix may be formatted into suitable packet(s) and transmitted at 177 as a beamforming information frame, completing the beamforming information exchange process. This beamforming information exchange process may sometimes also be referred to as a beamforming training sequence.

At 178, the MIMO transmitter may extract the coefficients of the precoding matrix that have been provided by the receiver and process them to obtain the actual configuration of the precoder, which may then be applied to the transmit precoder at 179. Once the transmit precoder has been configured, the transmitter may subsequently send user data frames; these frames may be processed by the transmit precoder to adapt them to the RF channel and transmitted as precoded signals 180. Such a process may maximize the signal to noise and interference ratio (SINR) at the MIMO receiver and may further enable optimal reception of the user data frames. (It is understood that the MIMO receiver may also utilize the RF channel properties to configure a receive decoder and receive demodulator, as is depicted in FIG. 6 and may yet further improve the SINR.)

FIG. 8 shows a simplified exemplary mathematical model of the process of precoding, transmission through a MIMO RF channel, and decoding. With respect to FIG. 8, vectors [x] and [y] represent complex-valued transmitted and received information signals respectively; complex vectors [V] and [U] may represent transmit precoding matrix and receive decoder matrix coefficients, respectively; and the RF channel existing between the MIMO transmitter and MIMO receiver is represented by [H]. At 200, the user data stream is input as a sequence of vectors [x]. In transmit precoder 201, the vectors are multiplied by the transmit precoding matrix [V], after which they are transmitted upon RF channel 202. The effect of the RF channel 202 upon the transmitted signal is represented by a multiplication by the channel matrix [H]. These signals are received by receive decoder 203 and multiplied further by receive decoder matrix [U], yielding a sequence of vectors [y] that comprise the received data. Note that this depiction is highly simplified for the purposes of explanation and does not include such elements as modulation, demodulation, spatial mapping, spatial demapping, coding, etc. that are not germane to this discussion. Also note that this is a simplified model and does not take into account operations such as vector transposes that may actually be required for the vectors [U] and [V].

The beamforming information exchange process may attempt to determine the coefficients of vectors [V] and [U] that will maximize the SINR of the signal transmitted through channel matrix [H]. An optimal beamforming information exchange process may calculate these vectors in such a way that, barring the effects of noise, the signal [y] matches the signal [x]; i.e., the effect of RF channel matrix [H] is nullified.

With regards to FIG. 9, an exemplary mathematical model of an MU-MIMO process is depicted. Note that the model may be applied to any number of transmitters and any number of receivers. It may be observed that the steps are substantially similar to that of the basic MIMO process shown in FIG. 8. Input signal vectors 210, 215, 220 corresponding to vectors $[x_1]$, $[x_2]$, $[x_3]$ respectively may be precoded by transmit precoders 211, 216, 221 with transmit precoding matrices $[V_1]$, $[V_2]$, $[V_3]$, after which they may transmitted over RF channels 212, 217, 222 with different channel matrices $[H_1]$, $[H_2]$, $[H_3]$ respectively. A distinguishing feature of MU-MIMO is that all of the signals are transmitted concurrently and share the same spatial environment; therefore, at 225 the transmitted signals are shown as being arithmetically combined, so that the same signals are effectively received at all sets of receive antennas. These signals may then be processed by receive decoders 213, 218, 223 with receive decoder matrices $[U_1]$, $[U_2]$, $[U_3]$ respectively, which may yield at 214, 219, 224 the output signal vectors $[y_1]$, $[y_2]$, $[y_3]$. Each transmit precoding matrix and each receive decoder matrix may preferably be adapted to the specific RF channel matrix existing between that transmitter/receiver pair. For instance, transmit precoding matrix $[V_1]$ and receive decoder matrix $[U_1]$ may be adapted to RF channel matrix $[H_1]$, which may ensure optimal decoding of signal $[y_1]$, and may further enable the RF signals generated by the other transmitter chains to be rejected. Separate channel estimation and beamforming feedback processes may hence be employed for each transmitter/receiver pair. As depicted in FIG. 10, channel estimation function 230 may process the signal received as $[y_1]$, and beamforming feedback function 234 may then pass the coefficients that may be used by transmit precoder 211 to the corresponding transmitter. Similarly, channel estimation functions 231, 232 and beamforming feedback functions 235, 236 may perform similar actions for other signal chains.

It is known that if orthogonal channel matrices $[H_1]$, $[H_2]$, $[H_3]$ exist between different transmitter/receiver pairs $[V_1]/[U_1]$, $[V_2]/[U_2]$, $[V_3]/[U_3]$ respectively, then orthogonal transmission modes exist between each transmitter/receiver pair. The transmit precoding matrices may be adjusted to utilize these orthogonal transmission modes. Further, the receive decoder matrices may be adapted to perform diversity reception within these orthogonal transmission modes. This may have the effect of raising the SINR of the desired signals while reducing the SINR of the undesired signals. It is further known that such an arrangement may enable simultaneous transmission and reception of independent signals $[x_1]$, $[x_2]$, $[x_3]$ over the same RF channel, which is the essence of MU-MIMO.

It is understood that the transmitter chains shown in FIG. 10 may be combined into a single device, while the receiver chains may be present in separate devices. Alternatively, the transmitter chains may be in separate devices, while the receiver chain may be combined into one device. (This latter situation is represented in FIG. 4.) Normal MU-MIMO usage situations entail one or the other of these cases. It is not of significant interest to consider the case of fully independent transmitter chains and fully independent receiver chains, as these degenerate to the standard MIMO usage situation.

It is apparent that an MU-MIMO system requires an RF channel with a multiplicity of orthogonal transmission modes between the different transmitter/receiver pairs, so that the transmit precoders and receive decoders can be adjusted to enhance the desired signals while suppressing undesired signals and noise. However, this situation is not obtained in a fully cabled environment. With reference to FIG. 11, a single MIMO transmitter/receiver pair is depicted, which may be equivalent to the MIMO transmitter/receiver pair shown in FIG. 8 with the exception that the antennas and the open-air MIMO RF transmission channel have been replaced by RF cables 241. As these cables may be nearly lossless and free of reflections, they may represent a channel matrix $[H_c]$ as shown at 240, which is an identity matrix. This may still be a valid MIMO environment for a single transmitter/receiver pair, and may still enable transmit signal [x] at 200 to be transmitted through the system and received as signal [y] at 204. Therefore, a MIMO system may still continue to function properly when cable-connected instead of using propagation through an actual RF environment.

Turning now to FIG. 12, a possible mathematical model of the MU-MIMO situation in a cabled environment is shown. This may comprise one or more transmitted signal streams 210, 215, 220 that may be precoded by transmit precoders 252, 253, 254 which implement the $[V_1]$, $[V_2]$, $[V_3]$ transmit precoding matrices respectively. The signals may then be passed through unitary RF channels 240, 241, 242, all of which have the identical RF transmission channel matrix $[H_c]$ created by cables 243. They may then be subsequently combined and distributed to receive decoders 213, 218, 223 as before, which may implement the $[U_1]$, $[U_2]$, $[U_3]$ matrices respectively. The output signals $[y_1]$, $[y_2]$, $[y_3]$ (214, 219, 224 respectively) may contain the decoded received data, which may also be fed to channel estimation functions 230, 231, 232, the outputs of which in turn may be fed to beamforming feedback 234, 235, 236 and subsequently used to configure transmit precoders 252, 253, 254.

It will be observed that in a cabled environment RF channel matrices $[H_c]$ between every pair of transmitter/receiver chains are identical, and are equal to the identity matrix. Further, channel estimation functions 230, 231, 232 will produce identical channel estimates, and hence the coefficients configured into transmit precoders 211, 216, 221 will be the same, as will the coefficients for receive decoders 213, 218, 223. As MU-MIMO relies for its operation on orthogonal RF channels creating orthogonal transmission modes, it is readily apparent that such a system cannot support simultaneous transmission and reception of independent signals. In the cabled situation depicted, therefore, the capacity of the RF transmission channel collapses to that of the simple MIMO case, and testing of MU-MIMO operation is not possible.

The known methods of MU-MIMO wireless testing therefore suffers from serious shortcomings. There is hence a need for improved MU-MIMO wireless data communication test systems and methods. A test system that is capable of performing tests upon MU-MIMO systems in a cabled environment may be desirable. It may be preferable for such a test system to eliminate the need for external channel simulators to enable the testing of multiple simultaneous transmitters or receivers at reduced cost. Further, such a test system may preferably permit different RF channels to be simulated for different transmitters or receivers without interaction between the channels. Finally, it may also be desirable for the test system to facilitate the testing of large-scale MU-MIMO systems with many transmitters and receivers.

SUMMARY

Systems and methods are disclosed herein that may provide improved techniques for performing testing of MIMO and MU-MIMO wireless data communication devices, systems and networks. Such techniques may enable the testing of such devices with reduced cost and higher efficiency, and may also decrease the complexity of the test system required to perform MIMO and MU-MIMO beamforming tests. The systems and methods disclosed may further extend the range and nature of the tests that may be performed, and may also allow automated tests to be conducted in a controlled and repeatable manner.

In accordance with an aspect of one embodiment, a network equipment test device, such as a wireless signal analyzer, is disclosed that may be operative to perform tests upon MIMO and MU-MIMO transmitters in a controlled RF environment. The analyzer may contain: radio channel generation functions, which create a statistical model of a simulated RF channel; sounding packet handshake logic to exchange sounding signals with the DUT containing suitable channel coefficients; precoding matrix calculation functions, which convert the simulated RF channel properties into the precoder coefficients of the sounding signal sent to the DUT; and receive decoder matrix functions, which perform a matrix decode upon the signals received from the DUT. The system may be further operative to cause the DUT to transmit signals to be analyzed that are precoded with the desired RF channel properties. A network equipment test device according to embodiments of the subject matter described herein may include one or more processors for executing the functions described herein.

Preferably, the wireless signal analyzer may be operative to represent multiple RF receivers with different simulated RF channels interposed between itself and the DUT, each RF channel corresponding to a different RF receiver. The wireless signal analyzer may further be operative to cause the DUT to transmit signals destined for a multiplicity of RF receivers simultaneously. The signal analyzer may be yet further operative to distinguish and decode these signals separately and perform measurements upon the decoded signals.

In accordance with an aspect of another embodiment, a wireless signal analyzer is disclosed that may be operative to perform tests upon MIMO and MU-MIMO receivers in a controlled RF environment. The analyzer may contain: simulated radio channel generation logic to create a statistical model of a simulated RF channel; a transmit precoding matrix function to condition a transmitted test signal according to the properties of the simulated RF channel; sounding protocol logic to perform a sounding packet exchange between the signal analyzer and the DUT containing suitable channel coefficients; and comparison logic to determine the efficacy of the channel estimation implemented by the DUT.

Such a wireless signal analyzer may be operative to represent multiple test signal transmitters with different RF channels between themselves and the DUT, and may further be operative to represent one or more transmitters communicating with multiple counterpart receivers within the DUT.

Advantageously, the coefficients of the sounding packets sent to the DUT may be adjusted to simulate the effect of one or more RF channels interposed between the DUT and the wireless signal analyzer, in a cabled environment without utilizing a channel simulator.

Advantageously, the coefficients of the sounding packets may be adjusted to cause the DUT to perform beamforming according to any simulated RF channel, which may permit increased flexibility in testing beamforming capabilities of the DUT.

Advantageously, the quality of the transmit precoding and beamforming performed within the DUT may be determined by transmitting sounding packets containing known coefficients representing a desired RF channel, causing the DUT to transmit data, decoding the data according to the coefficients of the RF channel, and verifying the quality of the decoded data.

Advantageously, the quality of the channel estimation performed within the DUT may be assessed by transmitting sounding signals that are predistorted in known ways and examining the coefficients within the sounding packets returned by the DUT.

Advantageously, a figure of merit may be measured for the channel estimation performed by a DUT when presented with a channel model by assessing the coefficients of the sounding packets returned by the DUT.

Advantageously, tests may be performed upon a DUT in an MU-MIMO system without requiring multiple channel simulators.

The subject matter described herein may be implemented in hardware, firmware, or software in combination with hardware or firmware. As such, the terms "function" or "module" as used herein refer to hardware, firmware, or software in combination with hardware or firmware for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The detailed description herein of the features and embodiments are best understood when taken in conjunction with the accompanying drawings, wherein.

It should be understood that like reference numerals are used to identify like elements illustrated in one or more of the above drawings.

DETAILED DESCRIPTION

Figure 13:
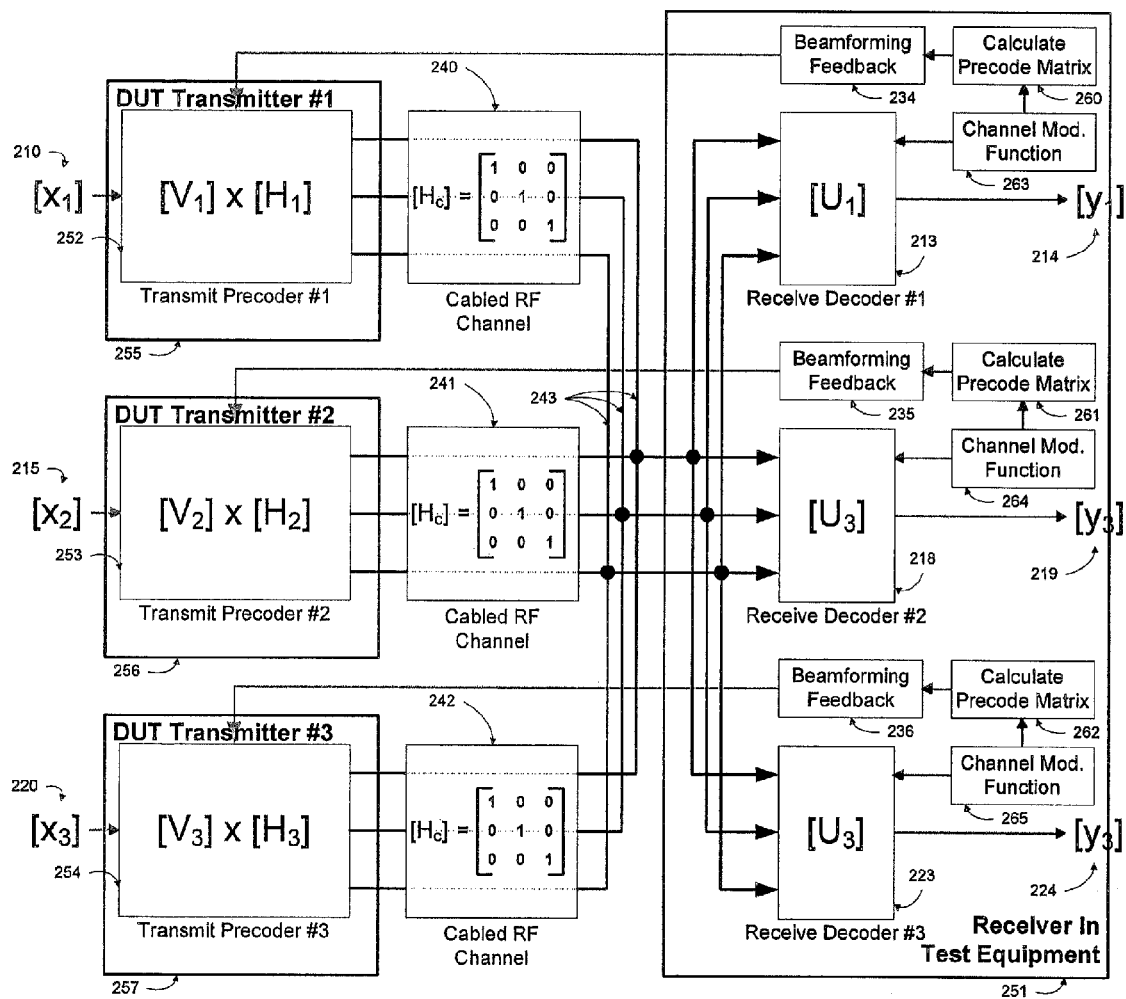
FIG. 13 depicts an exemplary aspect of a test system that utilizes a simulated channel model and beamforming feedback to perform MU-MIMO tests in a cabled RF environment.

With reference to FIG. 13, an aspect of an embodiment of a wireless MU-MIMO test system may comprise MU-MIMO test equipment receiver 251 within a test system that may be connected using RF cables 243 to multiple DUT transmitters 255, 256, 257. If required, RF power combiners may be used to couple together the multiple DUT transmitters without mismatch problems. It should be understood that while FIG. 13 (and subsequent drawings) show transmitters, receivers and cables in sets of three, this is done only for representational convenience, and the principles set forth herein apply to arbitrary numbers of transmitters, receivers and cables.

MU-MIMO receiver 251 may further comprise: receive decoders 213, 218, 223 that implement calculated receive decode matrices $[U_1]$, $[U_2]$, $[U_3]$ respectively; channel modeling functions 263, 264, 265; precode matrix calculation functions 260, 261, 262; and beamforming feedback functions 234, 235, 236. RF cables 243 may be equivalent to RF channels appearing as three identity matrices $[H_c]$ (240, 241, 242) that may couple the DUT transmitters to the test equipment receiver. Each of DUT transmitters 255, 256, 257 may contain separate transmit precoders 252, 253, 254, the coefficients of which may be determined by the beamforming feedback received from beamforming feedback functions 234, 235, 236.

Channel modeling functions 263, 264, 265 may generate the parameters of any desired RF channel, and may further generate orthogonal RF channels $[H_1]$, $[H_2]$, $[H_3]$ having orthogonal transmission modes. Normally, precode matrix calculation functions 260, 261, 262 may simply calculate actual [$V_1$], [$V_2$], [$V_3$] transmit precoding matrices, as it is assumed that real RF channels corresponding to [$H_1$], [$H_2$], [$H_3$] are interposed between MU-MIMO transmitters and receivers. However, in this aspect, precode matrix calculation functions 260, 261, 262 may include the modeled RF channels into the calculation, such that the coefficients transmitted by beamforming feedback functions 234, 235, 236 may contain the product of [$V_1$], [$V_2$], [$V_3$] and [$H_1$], [$H_2$], [$H_3$] respectively. When these coefficients are sent to DUT transmitters 255, 256, 257, they may configure transmit precoders 252, 253, 254 with the appropriate products as shown.

Figure 1:
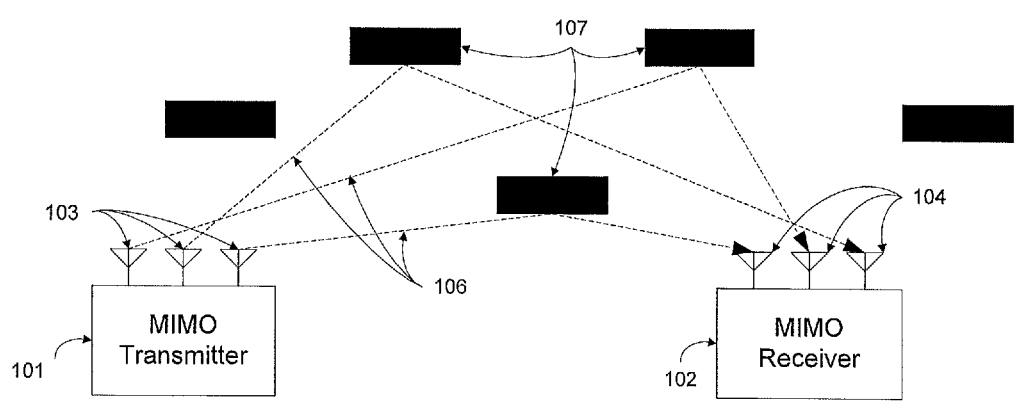
FIG. 1 shows a simplified representation of a MIMO transmitter and MIMO receiver operating in an RF channel environment.
Figure 2:
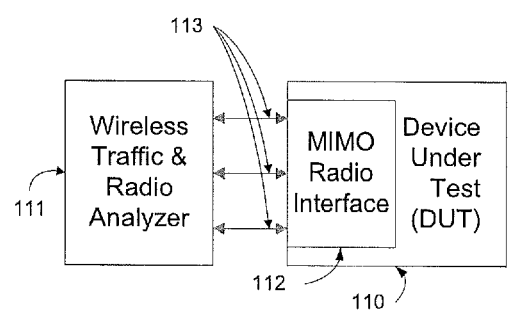
FIG. 2 provides an illustrative view of an exemplary conventional wireless test system for testing a MIMO DUT.
Figure 3:
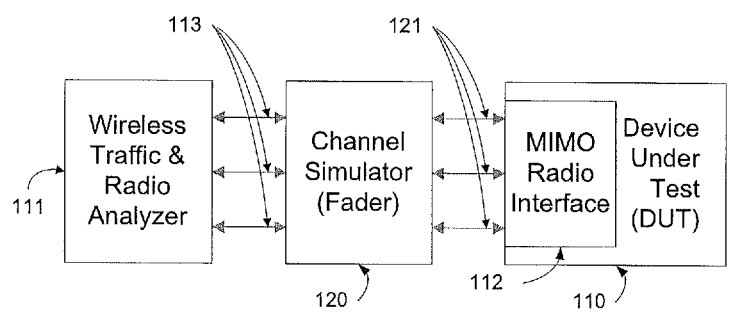
FIG. 3 represents an illustrative view of an exemplary conventional wireless test system used in association with a MIMO channel analyzer to test a MIMO DUT under different RF channel conditions.
Figure 4:
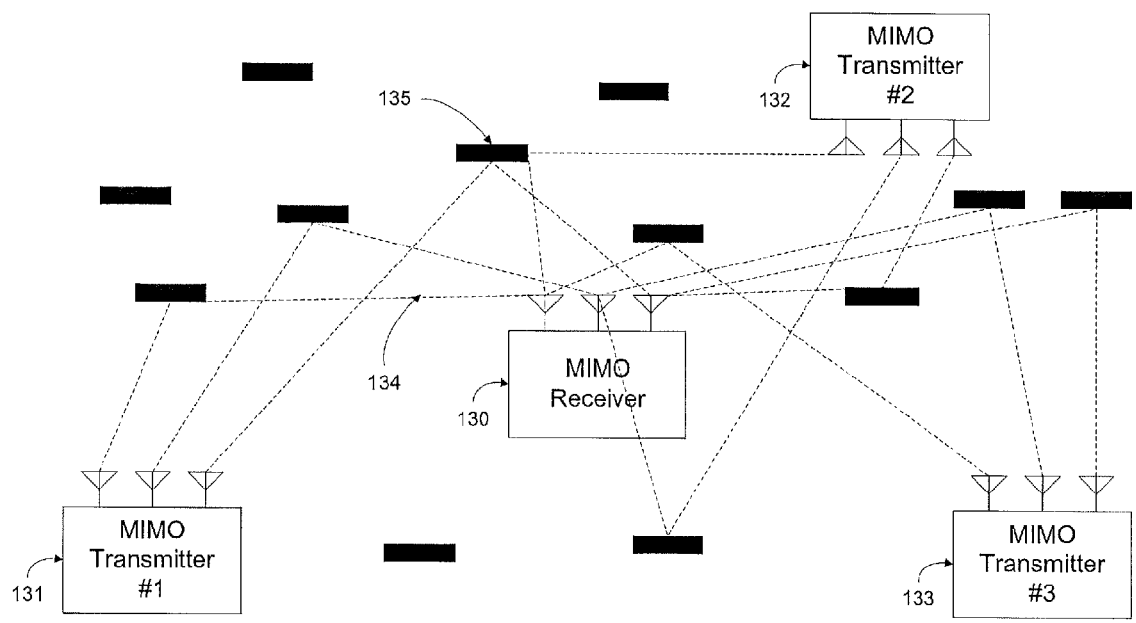
FIG. 4 shows a simplified representation of an MU-MIMO RF environment, comprising multiple MU-MIMO RF transmitters concurrently transmitting signals to a MU-MIMO RF receiver.
Figure 5:
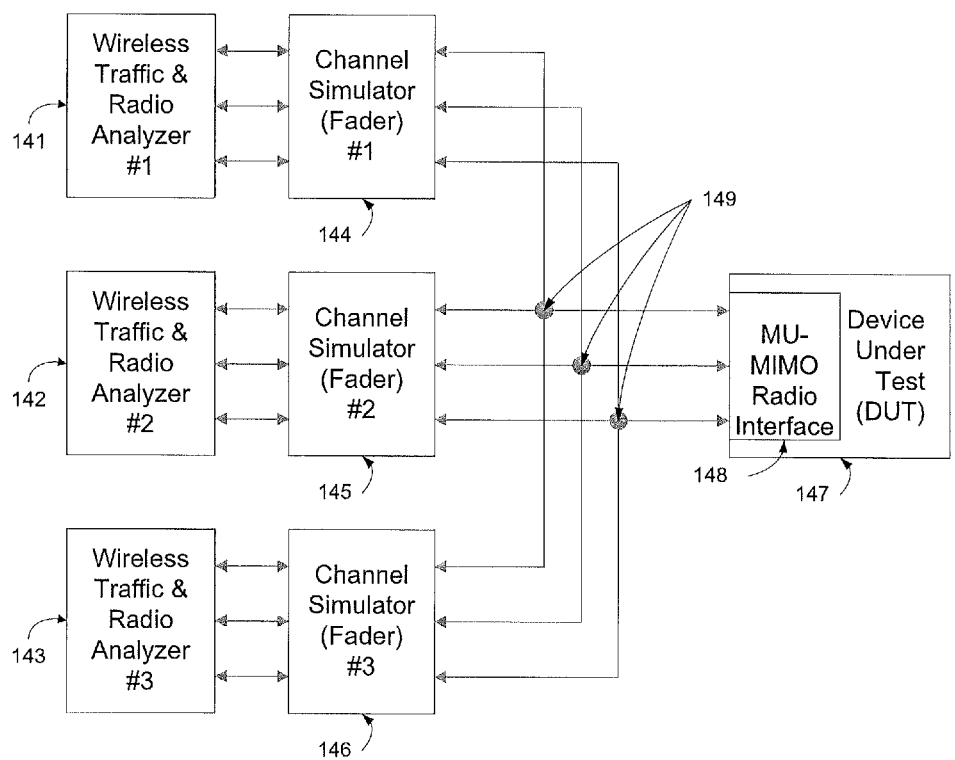
FIG. 5 provides an exemplary block diagram of a test system for conducting tests on an MU-MIMO DUT, in accordance with conventional systems and methods.
Figure 6:
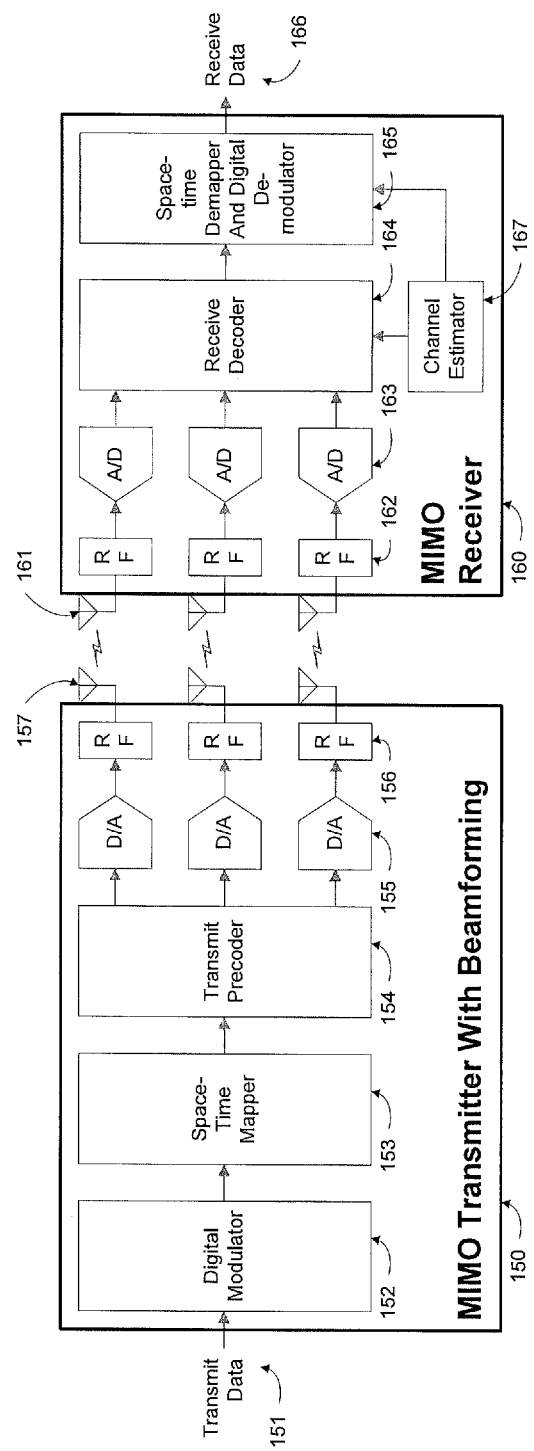
FIG. 6 exemplifies a possible block diagram of an MU-MIMO wireless transmitter and an MU-MIMO wireless receiver.
Figure 7:
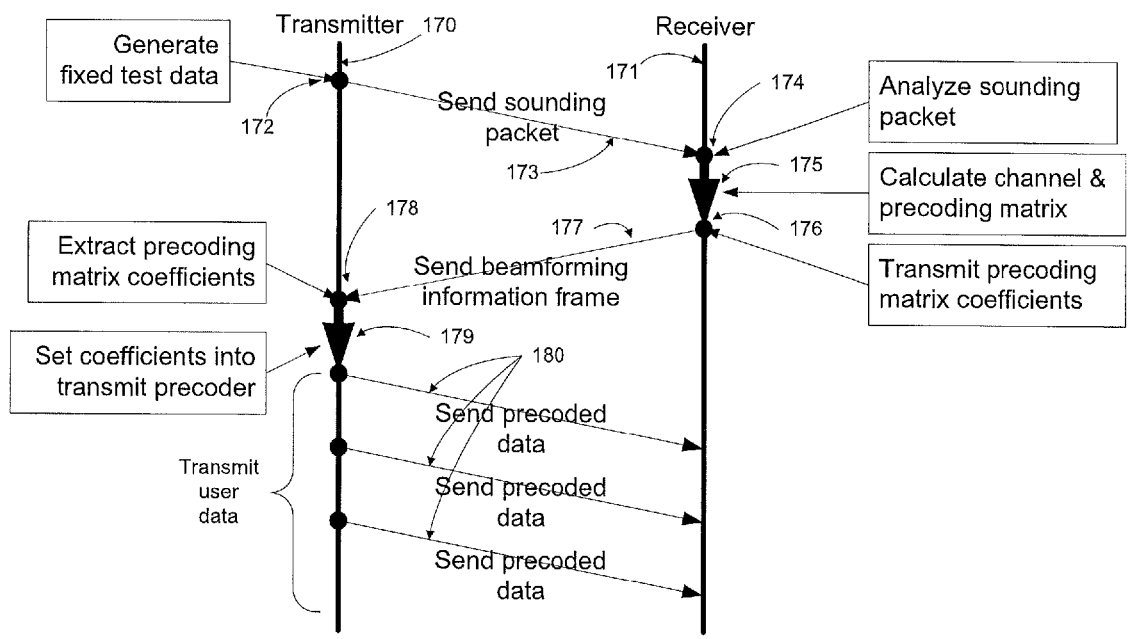
FIG. 7 represents the steps of an exemplary sounding packet exchange wherein beamforming information is calculated from channel sounding measurements and subsequently used for conditioning transmitted signal data packets.
Figure 8:
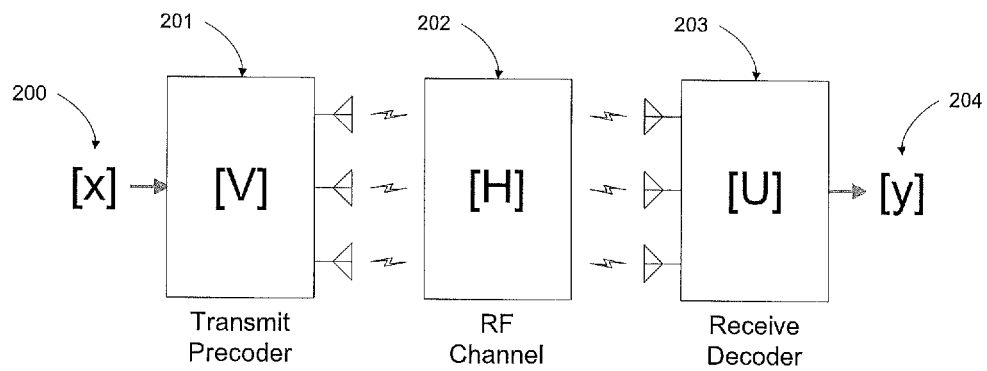
FIG. 8 is representative of a simplified mathematical model of signal transmission and reception in a MIMO RF channel environment.

DUT transmitters 255, 256, 257 may drive transmit signals through cables 243 to MU-MIMO receiver 251. The effect upon each transmitted signal is to multiply it with the identity matrix [$H_c$], which leaves the transmitted signal unchanged. It will be appreciated upon comparison of FIG. 9 and FIG. 13 that transmit data signals [$x_1$], [$x_2$], [$x_3$] (210, 215, 220 respectively) after processing in this fashion by transmit precoders 252, 253, 254 and transmission to MU-MIMO receiver 251 may now represent the effect of having passed through three orthogonal RF channels [$H_1$], [$H_2$], [$H_3$]. It will be further appreciated that external channel simulators (such as those shown in FIG. 5) may not be required between DUT transmitters 255, 256, 257 and MU-MIMO receiver 251 to achieve this effect. Instead, transmit precoders 252, 253, 254 within DUT transmitters 255, 256, 257 have accomplished the same effect, considerably reducing the system cost. It will yet further be appreciated that the adverse effects of coupling multiple channel simulators as depicted in FIG. 5 are not present, in spite of the cabled coupling of all the DUT transmitters 255, 256, 257.

Receive decoders 213, 218, and 223 may include signal processing functions responsive to signals transmitted by the DUT and coupled to a respective one of the channel modeling functions 263, 264, and 265. Each signal processing function is operative to simulate the effect of a modeled RF channel on the signals transmitted by said DUT. The signal processing function simulates the effect of the modeled RF channel by applying the [U] decode matrix to the received signal.

Figure 14:
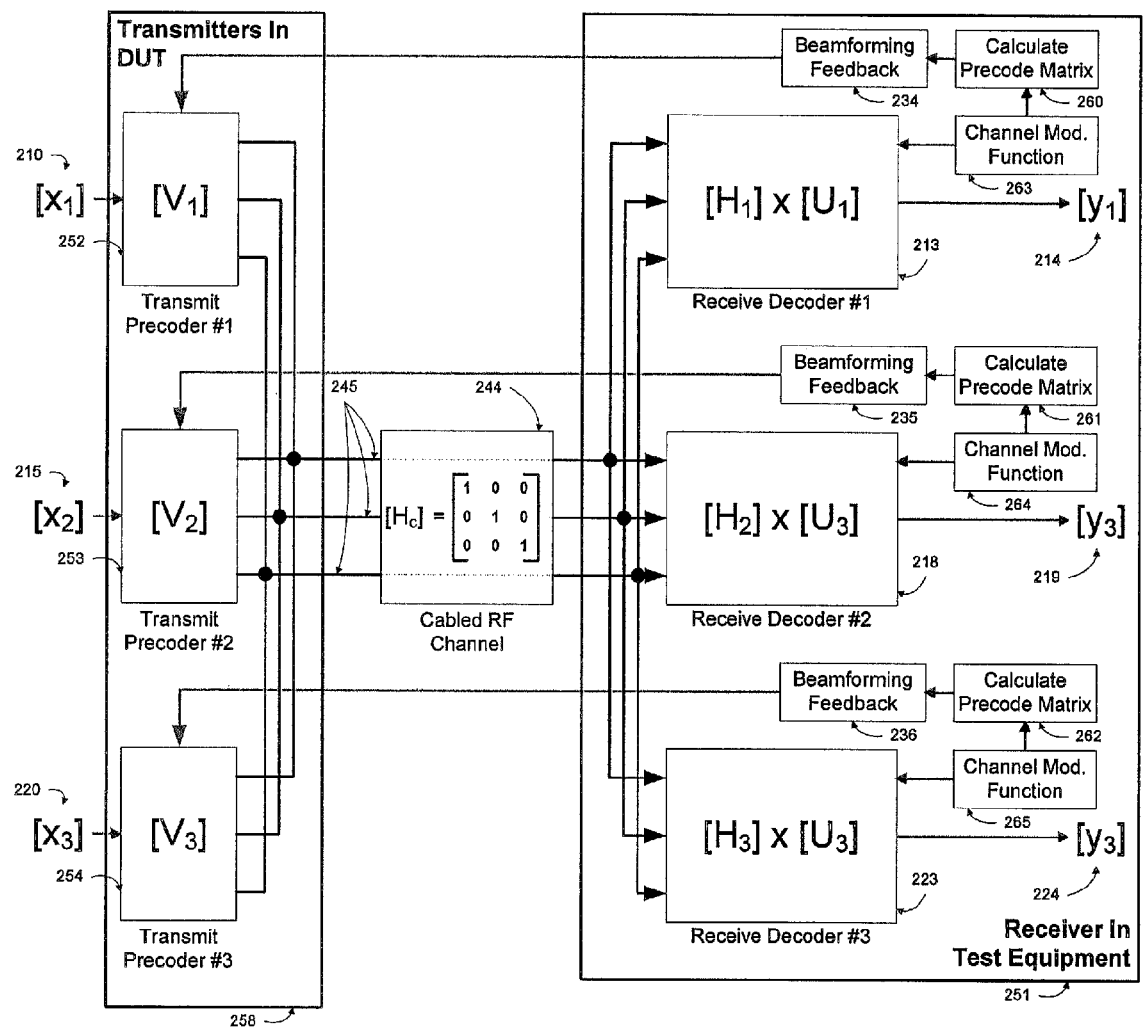
FIG. 14 provides another exemplary aspect of a test system that utilizes a simulated channel model and receive decoder matrix coefficients to perform MU-MIMO tests in a cabled RF environment.

Turning now to FIG. 14, an aspect of another embodiment of a wireless MU-MIMO test system may comprise a DUT 258 and MU-MIMO test system 251. DUT 258 may contain one or more MU-MIMO transmit chains accepting separate input signals [$x_1$], [$x_2$], [$x_3$] (210, 215, 220 respectively), that may be processed by transmit precoders 252, 253, 254 that are configured with matrices [$V_1$], [$V_2$], [$V_3$] respectively. The outputs of the transmit precoders may be coupled together within DUT 258 to drive a single set of cables 245, whose RF propagation matrix 244 may be represented by [$H_c$] (an identity matrix). These cables may in turn be coupled to MU-MIMO test equipment receiver 251, which may contain receive decoders 213, 218, 223 that accept and process the signals from cables 245 to generate independent output signals [$y_1$], [$y_2$], [$y_3$] (214, 219, 224 respectively). Channel modeling functions 263, 264, 265 may be used to set up receive decoders 213, 218, 223, as well as to drive precode matrix calculation functions 260, 261, 262 respectively. Beamforming feedback functions 234, 235, 236 may pass beamforming feedback generated by precode matrix calculation functions 260, 261, 262 to DUT 258, and this feedback may be used to configure transmit precoders 252, 253, 254.

Figure 10:
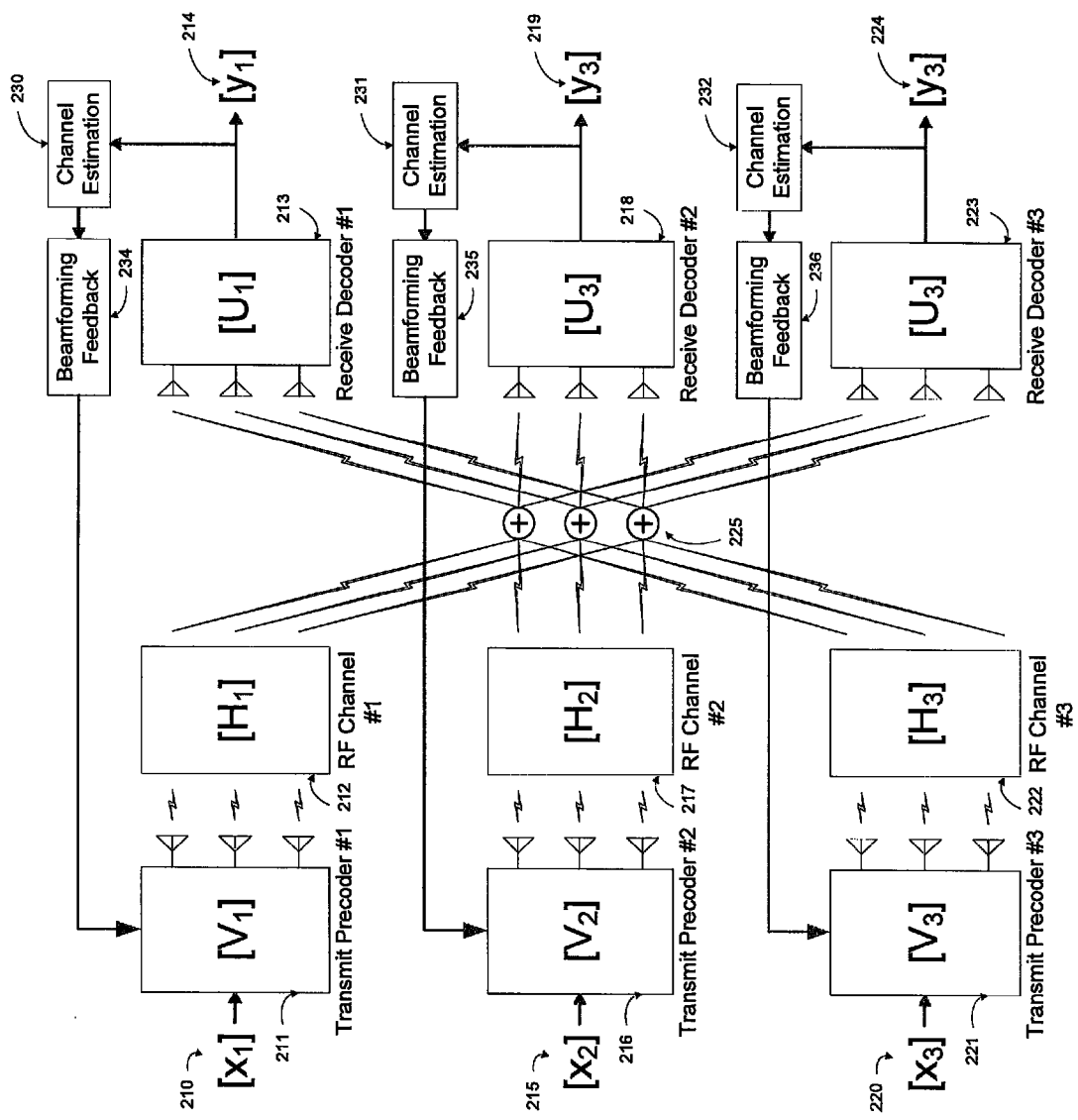
FIG. 10 shows an example of channel estimation and beamforming feedback in the context of a simplified MU-MIMO RF channel environment, with one or more receivers and transmitters.
Figure 11:
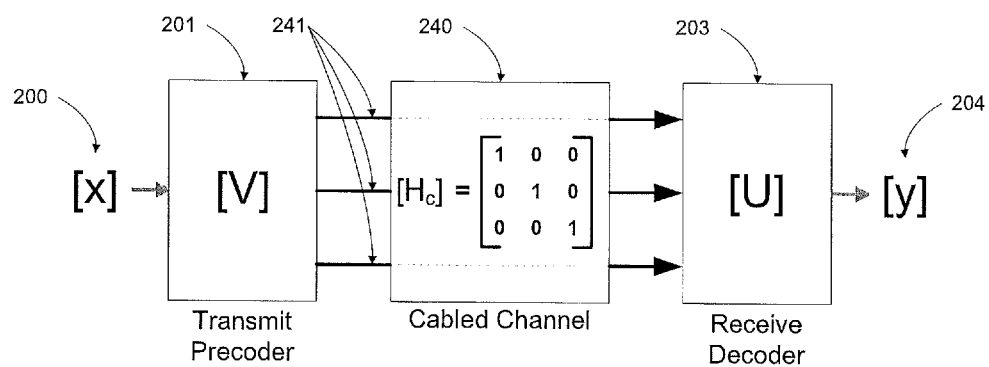
FIG. 11 depicts a possible mathematical model of a cabled RF environment applied to a MIMO RF transmitter and receiver.
Figure 12:
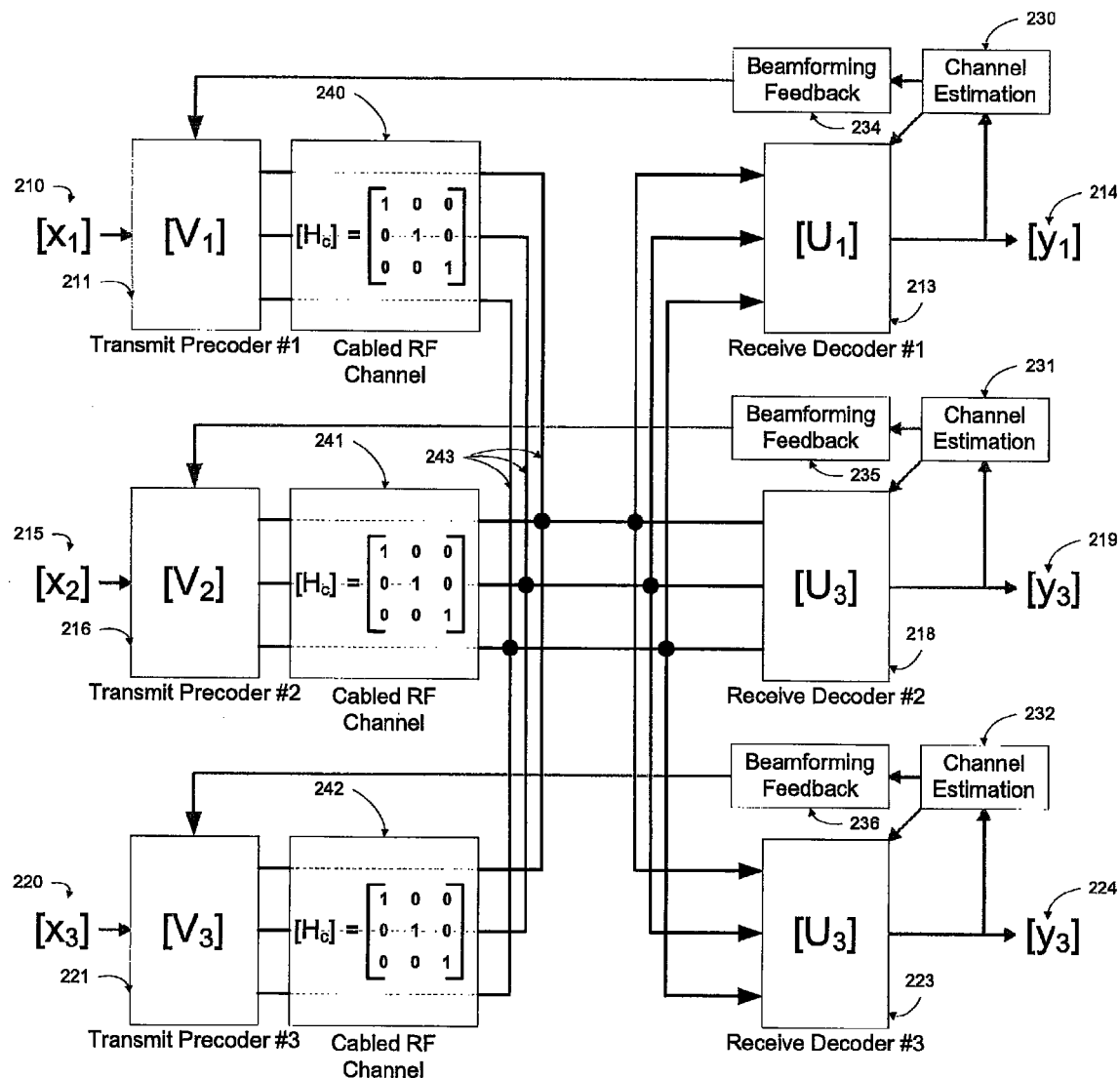
FIG. 12 exemplifies the extension of the mathematical model for a cabled RF environment extended to include MU-MIMO RF transmitters and receivers.

In this aspect, the beamforming feedback to the DUT transmitters may be used to set up transmit precoders 252, 253, 254 with the coefficients of the [$V_1$], [$V_2$], [$V_3$] matrices, as may be performed in a normally operating MU-MIMO transmitter. Therefore, the channel models generated by channel modeling functions 263, 264, 265 may be used in the same manner as measured channel estimates 230, 231, 232 in FIG. 10. However, the channel modeling functions 263, 264, 265 may further be used to configure receive decoders 213, 218, 223 with the product of the simulated RF channel matrices [$H_1$], [$H_2$], [$H_3$] and corresponding receive decode matrices [$U_1$], [$U_2$], [$U_3$]. This may have the effect of configuring orthogonal channels between different transmitter/receiver pairs, and may thereby preserve the ability of the system to support MU-MIMO operation.

The system depicted in FIG. 14 may be used for several purposes. As an example of one such application, test equipment 251 may measure the quality of the transmit precoding performed by DUT 258, by the steps of:

a) generating different RF channel matrices [$H_1$], [$H_2$], [$H_3$] in channel modeling functions 263, 264, 265;

b) performing the precode matrix calculation in 260, 261, 262 and returning sounding signals via beamforming feedback functions 234, 235, 236;

b) causing DUT 258 to transmit known data [$x_1$], [$x_2$], [$x_3$];

c) decoding the signals received from DUT 258 with the correct set of RF channel matrices [$H_1$], [$H_2$], [$H_3$] and receive decode matrices [$U_1$], [$U_2$], [$U_3$]; and d) comparing the signals [$y_1$], [$y_2$], [$y_3$] against the known data [$x_1$], [$x_2$], [$x_3$] to obtain an error metric, one example of which may be the bit error ratio (BER);

Test equipment 251 may use an arbitrary number of complex channel models to determine the capacity of DUT 258 to handle these types of RF channels accurately.

As an example of another application, it may be desirable to simulate the effect of multiple stations (such as wireless clients) at test equipment 251 when testing DUT devices 258 such as APs. In this case, the system may cause channel modeling functions 263, 264, 265 to generate multiple RF channel models. Each modeled channel may represent the RF propagation between DUT 258 and one of the multiple simulated stations. The system may further present the precode matrices resulting from these multiple channels to DUT 258 in succession, possibly using separate beamforming exchanges. After this, the system may cause DUT 258 to transmit test traffic to all of the simulated stations, and verify that DUT 258 uses the correct precode matrix for each of these simulated stations. This may enable the test system to verify the station capacity supported by DUT 258. An example of one means of determining the station capacity is by increasing the number of simulated stations until DUT 258 fails to use the correct precode matrices when transmitting test traffic.

As an example of yet another application, it may be useful to determine whether DUT 258 is capable of quickly responding to RF channel variations over time. Such variations may correspond to those caused by Doppler shifts due to relative motion. In this example, test equipment 251 may cause channel modeling functions 263, 264, 265 to generate time-varying simulated RF channels, which may then be processed by precode matrix calculation functions 260, 261, 262 to produce transmit precoder coefficients which may then be sent to DUT 258 by beamforming feedback functions 234, 235, 236. An error metric, which may include the BER, may be used to determine the ability of DUT 258 to respond quickly and accurately to RF channel variations.

Figure 15:
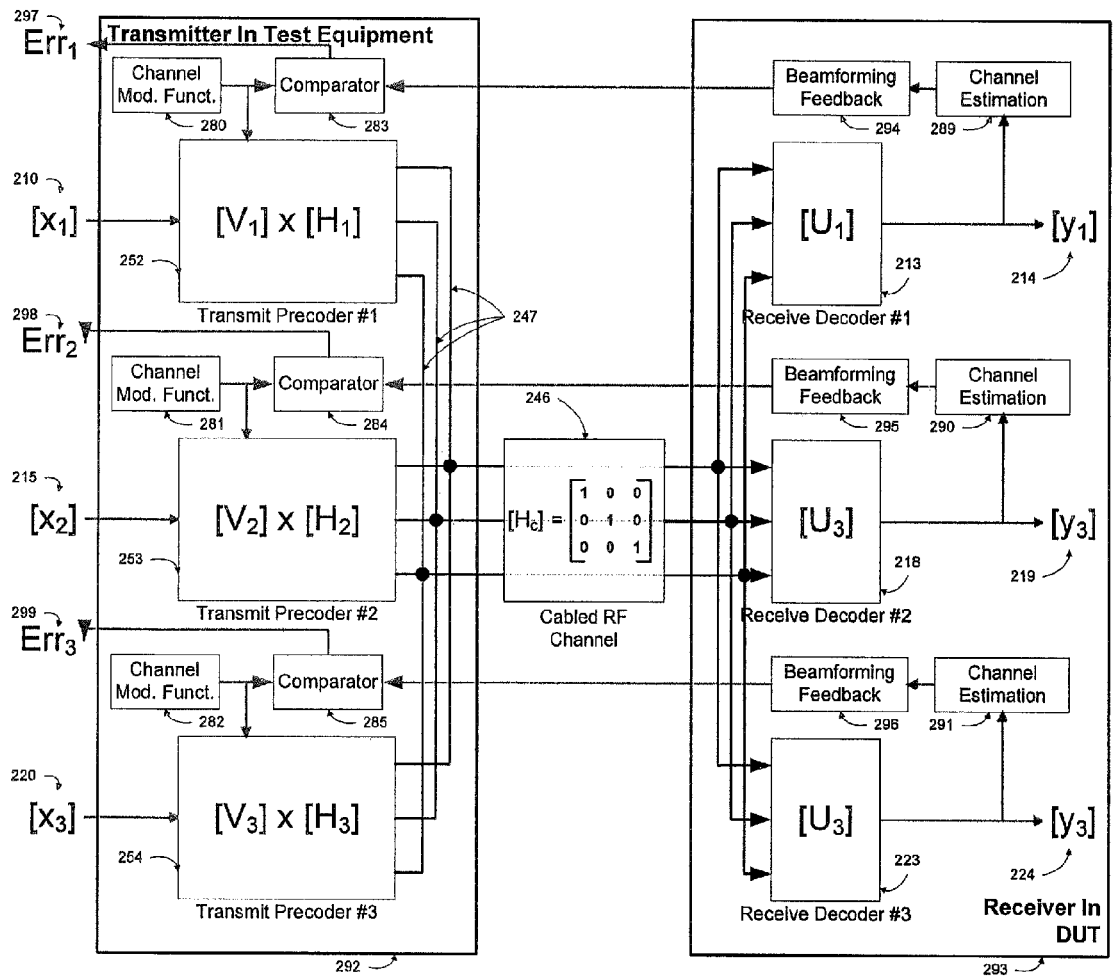
FIG. 15 shows an exemplary aspect of a test system that potentially derives channel estimation error vectors utilizing a simulated channel model together with comparison of beamforming feedback parameters.

FIG. 15 depicts an aspect of another embodiment of an MU-MIMO test transmitter 292 within a wireless MU-MIMO test system, which may be used to quantify the channel estimation error within the receiver 293 of an MU-MIMO DUT. This aspect may include input test signals [$x_1$], [$x_2$], [$x_3$] (210, 215, 220 respectively); transmit precoders 252, 253, 254; channel modeling functions 280, 281, 282, each of which may model any desired RF channel and may generate RF channel matrices [$H_1$], [$H_2$], [$H_3$]; and beamforming feedback coefficient comparators 283, 284, 285, which may compare expected coefficients corresponding to the modeled RF channels with actual coefficients returned by DUT 293, and may further generate error signals 297, 298, 299. It is understood that other functions may also be performed within transmitter 292, but are not relevant to this discussion and are therefore omitted.

DUT receiver 293 may perform the standard MU-MIMO channel estimation and beamforming feedback processes, and may include receive decoders 213, 218, 223, that may process received signals with receive decoder matrices [$U_1$], [$U_2$], [$U_3$] to produce output signals [$y_1$], [$y_2$], [$y_3$] (214, 219, 224 respectively). DUT receiver 293 may further include channel estimation functions 289, 290, 291 and beamforming feedback functions 294, 295, 296 that may serve to return transmit precoder coefficients to MU-MIMO test transmitter 292.

In operation, channel modeling functions 280, 281, 282 may generate any desired set of RF channels [$H_1$], [$H_2$], [$H_3$], which may then be multiplied into a set of optimal transmit precoding matrices [$V_1$], [$V_2$], [$V_3$] and configured into transmit precoders 252, 253, 254. Known test signals [$x_1$], [$x_2$], [$x_3$] (210, 215, 220 respectively) may then be passed into transmit precoders 252, 253, 254, combined via cables 247 and driven to DUT receiver 293. The cables 247 may present a single RF channel 246, which may be an identity matrix [$H_c$]. These signals may be received by each of the receive chains within DUT 293. A beamforming information exchange process or beamforming training sequence may then be performed between each transmitter/receiver pair by channel estimation functions 289, 290, 291 and beamforming feedback functions 294, 295, 296. As the RF channels [$H_1$], [$H_2$], [$H_3$] may be known in advance by MU-MIMO transmitter 292, the coefficients expected to be fed back during the beamforming exchange may likewise be precalculated by channel modeling functions 280, 281, 282. These coefficients may be passed to comparators 283, 284, 285, which may compare them to the coefficients actually fed back by DUT receiver 293, and may generate error signals 297, 298, 299. An assessment of these error signals may provide an indication of the quality of the channel estimation that may be performed by DUT receiver 293. Further, such an assessment may be performed for different modeled RF channels [$H_1$], [$H_2$], [$H_3$], which may provide a quantitative assessment of the ability of DUT receiver 293 to cope with a wide variety of RF channel conditions.

An example of another application of the aspect depicted in FIG. 15 may be to determine the ability of DUT receiver 293 to handle channel estimation and beamforming feedback for a large number of transmitters with a correspondingly large number of different RF channels between each transmitter/receiver pair. In this application, channel modeling functions 280, 281, 282 may be configured to successively generate different RF channel models, and each channel model may correspond to a different simulated transmitter. Test equipment transmitter 292 may then perform sounding packet exchanges with DUT receiver 293 to cause channel estimation and beamforming information exchange to occur between each of these simulated transmitters and DUT receiver 293. DUT receiver 293 may then store the required [U] matrix for subsequent use when receiving data from that specific simulated transmitter. MU-MIMO test transmitter 292 may then cycle through the [H] and [V] matrices for each of the simulated transmitters, and may further transmit test signals [x] to determine if DUT receiver 293 can identify and configure the correct [U] matrix into receive decoders 213, 218, 223. Determination of whether DUT receiver 293 has successfully identified the simulated transmitter and use the correct [U] matrix may be performed by analyzing the receive signal [y]. One possible analysis method is to compare the received signal [y] with the transmitted test signal [x].

In situations where it may become necessary to quantitatively assess the efficacy of the channel estimation and beamforming calculations performed by an MU-MIMO DUT, it may be desirable to develop a Figure Of Merit (FOM) for the combined process. The FOM weighs the SNR achievable using the parameters calculated by the DUT against the SNR achieved for the same test signals using the same RF channel but with a known optimal algorithm. One possible example of such an algorithm is a water-filling algorithm. For example, in the MU-MIMO case, the SNR may be expressed as $E_b/N_o$, which is the ratio of the signal energy per bit of transmitted data to the specific noise power, at a specific value of an error metric, which may be the BER. It may be possible to calculate the FOM using the arrangement of FIG. 15, for some predetermined simulated RF channels described by matrices [$H_1$], [$H_2$], [$H_3$].

Figure 9:
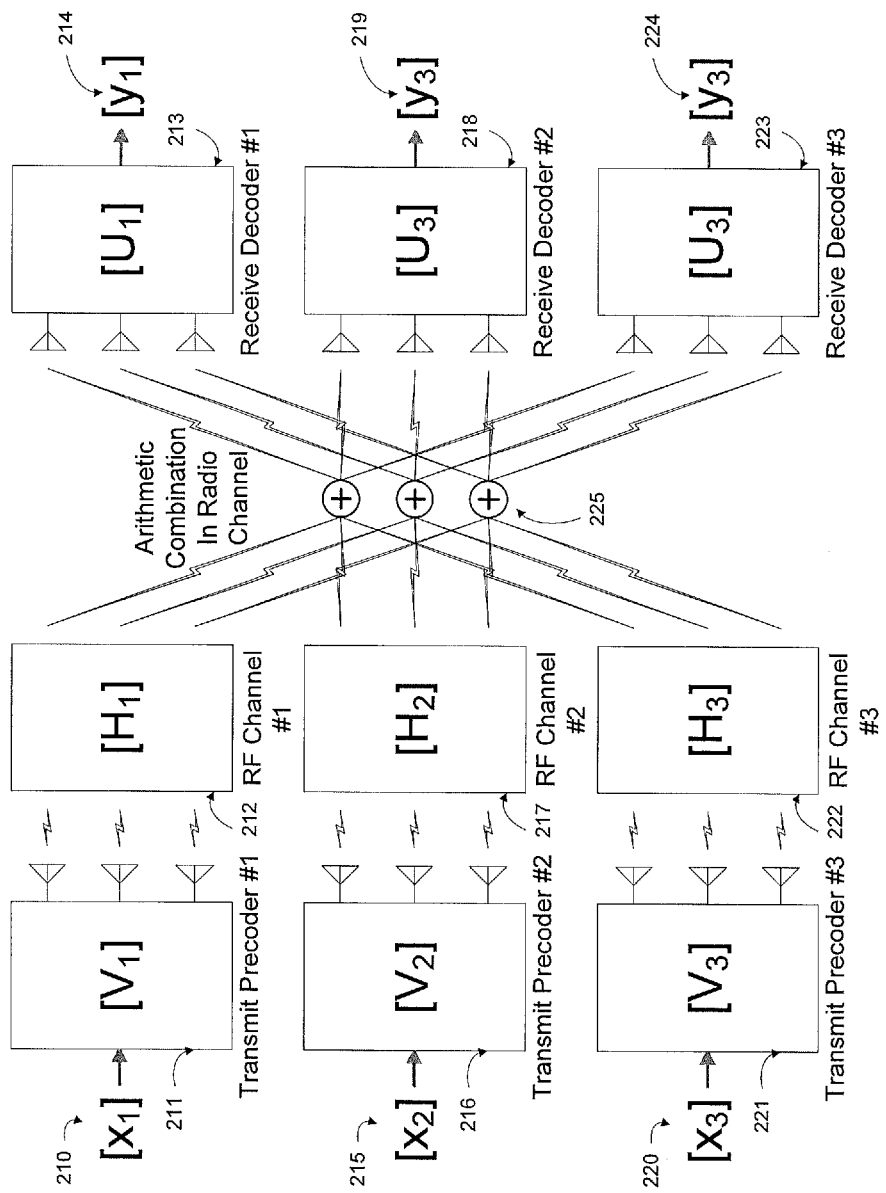
FIG. 9 illustrates one possible simplified mathematical model of signal transmission and reception in a MU-MIMO RF channel environment comprising one or more receivers and transmitters.
Figure 16:
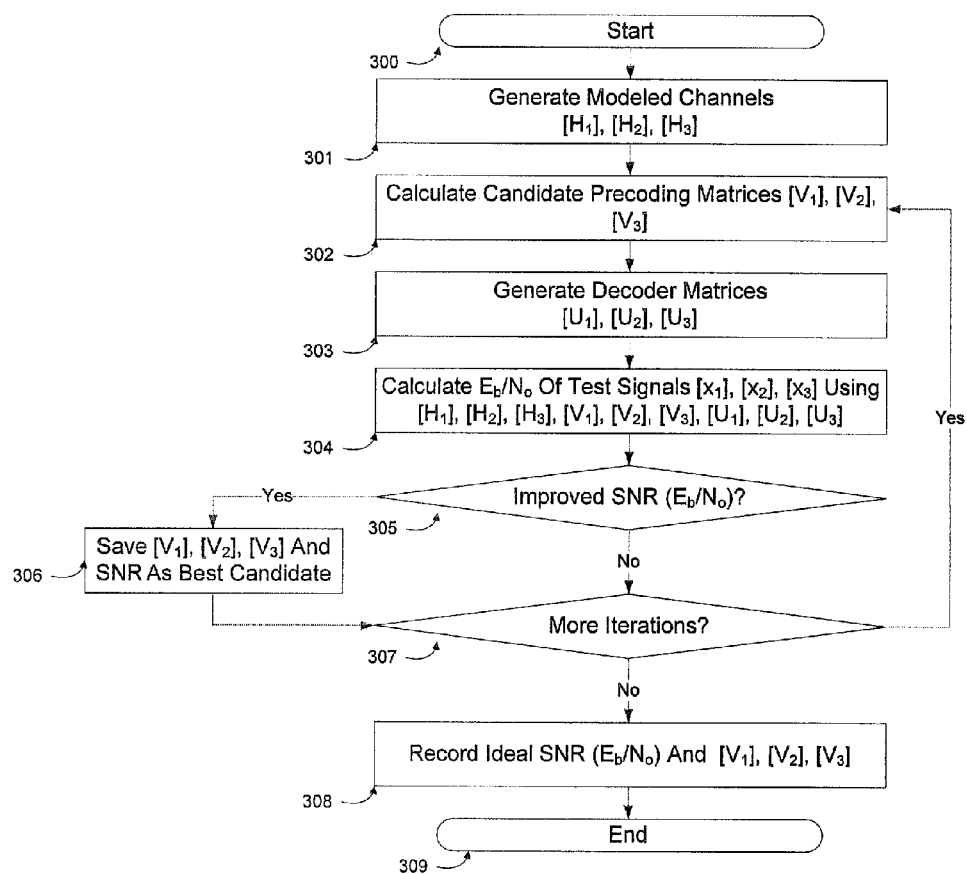
FIG. 16 shows an illustrative flow chart of one possible method of obtaining the optimal SNR value for a set of one or more simulated RF channels.

Turning now to FIG. 16, a flowchart of an exemplary iterative procedure for obtaining the optimal SNR and transmit precoding matrices for a set of simulated RF channels [$H_1$], [$H_2$], [$H_3$] and a set of test signals [$x_1$], [$x_2$], [$x_3$] at a predetermined value of an error metric is depicted. The procedure illustrated in FIG. 16 may be implemented by emulated MU-MIMO transmitter 292 illustrated in FIG. 15 where precoders 252, 253, and 254 cycle through [V] matrices until an optimal [V] matrix is found. Alternatively, the procedure illustrated in FIG. 16 may be performed by emulated MU-MIMO receiver 251 illustrated in FIG. 13 in combination with a real or emulated MIMO transmitter. As such, MU-MIMO receiver 251 may include an SNR calculation function that calculates the SNR for each iteration of the test, an SNR of different iterations of the test, and saving the precoding matrix that generates the optimal SNR. Precoding matrix calculation functions 260, 261, and 262 may be configured to compute the set of precoding matrices [$V_1$], [$V_2$] and [$V_3$] used in each test iteration. Receive decoders 213, 218, and 233 may calculate the receive decoder matrices [$U_1$], [$U_2$], and [$U_3$] based on the modeled channel matrices [$H_1$], [$H_2$], and [$H_3$]. The procedure illustrated in FIG. 16 may follow the steps of:

a) At step 300, beginning the process;
b) At step 301, generating a set of modeled RF channel matrices [$H_1$], [$H_2$], [$H_3$];
c) At step 302, computing a set of candidate transmit precoding matrices [$V_1$], [$V_2$], [$V_3$] that match the RF channel matrices;
d) At step 303, computing the corresponding set of candidate receive decoding matrices [$U_1$], [$U_2$], [$U_3$]
e) At step 304, using a system model, that may be similar to that depicted in FIG. 9, to calculate the SNR of a predetermined test signal, which may be the $E_b/N_o$ value required for a predetermined value of the error metric;
f) At step 305, determining whether the SNR so calculated is improved (i.e., is lower than) all previously calculated SNR values;
g) At step 306, if the SNR is in fact improved, saving the SNR value as the best candidate and also saving the corresponding candidate transmit precoding matrices [$V_1$], [$V_2$], [$V_3$]
h) At step 307, determining if more iterations are required, in which case the procedure may return to step 302 to calculate a new set of candidate precoding matrices

[V₁], [V₂], [V₃], and may repeat steps 303 through 306 to determine the corresponding SNR value;

i) At step 308, recording the last saved value from step 306 as the optimal SNR value, and the corresponding transmit precoding matrices as the optimal precoding matrices; and j) At step 309, terminating the process.

Figure 17:
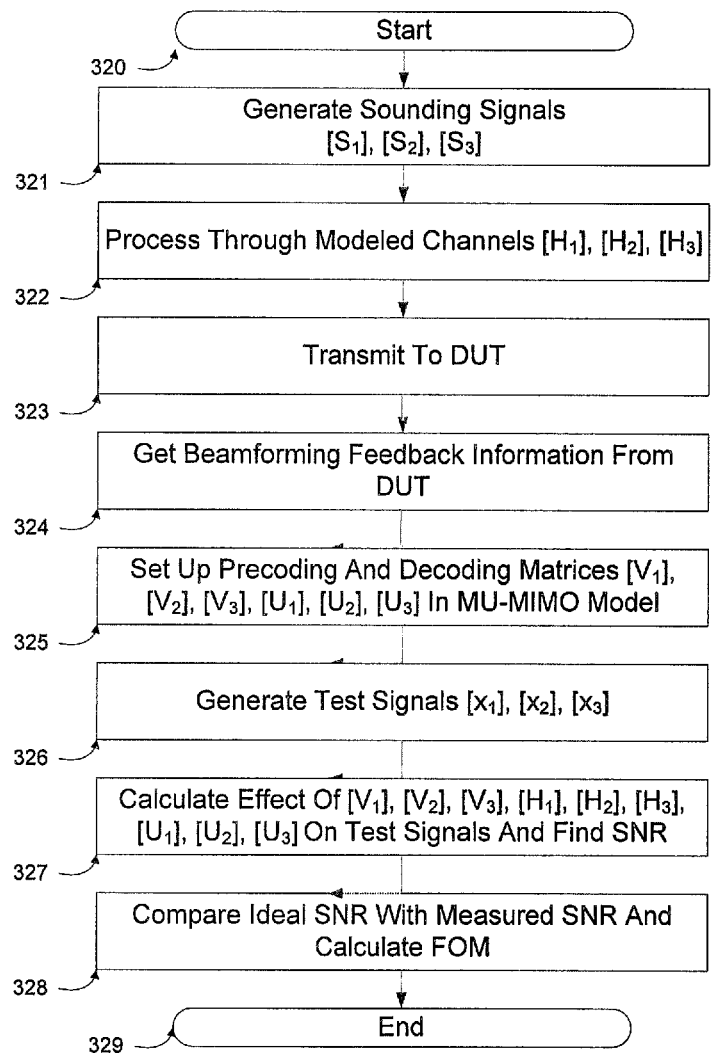
FIG. 17 depicts an exemplary flow chart for a possible procedure for calculating a Figure of Merit for the channel estimation and beamforming feedback parameters produced by a DUT.

Upon calculating an optimal SNR value and corresponding transmit precoding matrices, FIG. 17 may depict one possible procedure for calculating the combined FOM for the channel estimator and beamforming calculator of a DUT receiver, for example DUT receiver 293 shown in FIG. 15. The procedure may be performed for the same modeled RF channels $[H_1]$, $[H_2]$, $[H_3]$ and test signals $[x_1]$, $[x_2]$, $[x_3]$ as used in the procedure depicted in FIG. 16. The procedure may take the steps of:

a) At step 320, beginning the process;

b) At step 321, generating predetermined sounding signals $[S_1]$, $[S_2]$, $[S_3]$ according to some predetermined beamforming information exchange process;

c) At step 322, processing these predetermined sounding signals as if they had been transmitted over the set of simulated RF channels;

d) At step 323, transmitting these processed signals to the DUT (for example, DUT receiver 293) as part of a beamforming exchange;

e) At step 324, receiving beamforming feedback from the DUT, containing transmit precoding matrix coefficients;

f) At step 325, using this beamforming feedback to set up transmit precoding matrices $[V_1]$, $[V_2]$, $[V_3]$ and corresponding receive decoding matrices $[U_1]$, $[U_2]$, $[U_3]$, possibly in an MU-MIMO system model, for example that depicted in FIG. 9;

g) At step 326, generating test signals $[x_1]$, $[x_2]$, $[x_3]$;

h) At step 327, injecting test signals $[x_1]$, $[x_2]$, $[x_3]$ into the MU-MIMO system model, and simulating the effect of the matrices $[V_1]$, $[V_2]$, $[V_3]$, $[H_1]$, $[H_2]$, $[H_3]$, $[U_1]$, $[U_2]$, $[U_3]$ on the test signals, which may include the step of calculating the SNR (such as the Eb/No for a predetermined value of an error metric such as the BER);

i) At step 328, determining the FOM by comparing the SNR determined at step 327 with the optimal SNR, which may be determined according to step (h) of the procedure depicted in FIG. 16; and j) At step 329, terminating the process.

It will be apparent to those of ordinary skill in the art that, in accordance with embodiments described herein, the generation of beamforming feedback coefficients in a MIMO or MU-MIMO test system from modeled or modified RF channel parameters may facilitate a number of useful test functions. These functions may include the use of arbitrary RF channel models, even in a cabled environment. It will be further apparent that such functions may not require the use of external channel simulators. It will be yet further apparent that arbitrary but well-defined RF channel models may be interposed between transmitter/receiver pairs. Advantageously, this may enable the testing of MIMO or MU-MIMO functionality, including beamforming, in a fully cabled environment with reduced cost and complexity, and may improve the ability to test MIMO and MU-MIMO functions in an automated manner.

It will be appreciated by those of ordinary skill in the art that, in accordance with aspects of embodiments described herein, the simulation of arbitrary RF channels between MIMO or MU-MIMO transmitter/receiver pairs may be performed on either the transmitter side or on the receiver side. Advantageously, this may increase the flexibility of the test setup and enable different types of DUTs to be tested.

It will also be appreciated by those of ordinary skill in the art that, in accordance with embodiments described herein, the efficacy of the channel estimation performed within the DUT may be assessed against an arbitrary set of RF channel models. It will be further appreciated that the efficacy of the transmit precoding calculations performed by the DUT may be quantitatively assessed. It will be yet further appreciated that, in accordance with the embodiments described herein, an FOM may be determined for the absolute quality of the channel estimation and beamforming calculations performed by a MIMO or MU-MIMO DUT. Advantageously, this may enable the testing of essential MIMO or MU-MIMO internal DUT functions.

Accordingly, while the subject matter herein has been described with reference to illustrative embodiments, this description is not intended to be construed in a limiting sense. Various modifications of the illustrative embodiments, as well as other aspects or embodiments of the subject matter described herein, will be apparent to persons of ordinary skill in the art upon reference to this description. These modifications shall not be construed as departing from the scope of the subject matter described herein, which is defined solely by the claims appended hereto.

What is claimed is:

1. A system for testing a wireless device under test (DUT), comprising:
   a network equipment test device including at least one processor, said network equipment test device further including:
      a channel modeling function for generating a predetermined modeled RF channel;
      a precode matrix calculator function coupled to said channel modeling function and operative to derive feedback parameters from said modeled radio frequency (RF) channel; and
      a beamforming feedback function operatively coupled to said precode matrix calculator function for transmitting said feedback parameters to said DUT, wherein said feedback parameters are operative to cause said DUT to modify the signals transmitted to said test system in accordance with said modeled RF channel.

2. The system of claim 1, wherein said system is adapted to test a Multiple Input Multiple Output (MIMO) DUT.

3. The system of claim 1, wherein said test device is adapted to test beamforming.

4. The system of claim 1, further comprising a plurality of said channel modeling functions, coupled to a plurality of said precode matrix calculator functions, further coupled to a plurality of said feedback functions.

5. The system of claim 4, wherein said test device is adapted to test a Multi User-MIMO (MU-MIMO) DUT.

6. The system of claim 5, wherein said test device is further adapted to test beamforming in an MU-MIMO DUT.

7. The system of claim 5, wherein said test device is coupled to said MU-MIMO DUT by RF cables.

8. The system of claim 4, wherein said plurality of said channel modeling functions is operative to generate at least two different modeled RF channels.

9. The system of claim 8, wherein said at least two different modeled RF channels represents the communication paths between at least two different transmitter/receiver pairs.

10. The system of claim 1, wherein said channel modeling function generates a plurality of modeled RF channels that are used in sequence.

11. The system of claim 4, wherein each of said plurality of channel modeling functions generates a plurality of modeled RF channels that are used in sequence.

12. A system for testing a wireless device under test (DUT), comprising:
- a network equipment test device including at least one processor, said network equipment test device further including:
  - a channel modeling function for generating a predetermined modeled radio frequency (RF) channel;
  - a precode matrix calculation function coupled to said channel modeling function and operative to derive feedback parameters from said simulated RF channel;
  - a beamforming feedback function operatively coupled to said computation function for transmitting said feedback parameters to said DUT; and
  - a signal processing function responsive to signals transmitted by said DUT and coupled to said channel modeling function, wherein said signal processing function is operative to simulate the effect of said modeled RF channel on said signals transmitted by said DUT.

13. The system of claim 12, wherein said test device is adapted to test a Multiple Input Multiple Output (MIMO) DUT.

14. The system of claim 12, wherein said test device is adapted to test beamforming.

15. The system of claim 12, further comprising a plurality of said channel modeling functions, coupled to a plurality of said precoding matrix computation functions, further coupled to a plurality of said feedback functions, further including a plurality of said signal processing functions.

16. The system of claim 15, wherein said test device is adapted to test a Multi User-Multiple Input Multiple Output (MU-MIMO) DUT.

17. The system of claim 16, wherein said test device is adapted to test beamforming in an MU-MIMO DUT.

18. The system of claim 16, wherein said test device is coupled to said MU-MIMO DUT by RF cables.

19. The system of claim 15, wherein said plurality of said channel modeling functions is operative to generate at least two different modeled RF channels.

20. The system of claim 19, wherein said at least two different modeled RF channels represents the communication paths between at least two different transmitter/receiver pairs.

21. The system of claim 12, wherein said channel modeling function generates a plurality of modeled RF channels that are used in sequence.

22. The system of claim 15, wherein each of said plurality of channel modeling functions generates a plurality of modeled RF channels that are used in sequence.

* * * * *